(12) United States Patent
Lum et al.

(10) Patent No.: US 7,904,604 B2
(45) Date of Patent: Mar. 8, 2011

(54) EXPEDITED AND LOW POWER COMMAND SEQUENCE SERVICING

(75) Inventors: CheeWai Lum, Singapore (SG); KokChoon See, Singapore (SG); LingLing Chua, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 541 days.

(21) Appl. No.: 10/893,853

(22) Filed: Jul. 19, 2004

(65) Prior Publication Data
US 2006/0015653 A1 Jan. 19, 2006

(51) Int. Cl.
*G06F 3/00* (2006.01)

(52) U.S. Cl. .......... 710/5; 710/10; 710/15; 712/233; 713/300; 713/323; 713/324; 713/330; 711/213

(58) Field of Classification Search .......... None
See application file for complete search history.

(56) References Cited

U.S. PATENT DOCUMENTS

| | | | |
|---|---|---|---|
| 5,452,277 A | 9/1995 | Bajorek et al. | |
| 5,481,733 A | 1/1996 | Douglis et al. | |
| 5,493,670 A | 2/1996 | Douglis et al. | |
| 5,682,273 A | 10/1997 | Hetzler | |
| 5,774,292 A | 6/1998 | Georgiou et al. | |
| 6,085,318 A * | 7/2000 | Vander Kamp et al. | 713/1 |
| 6,173,339 B1 * | 1/2001 | Yorimitsu | 710/5 |
| 6,401,193 B1 * | 6/2002 | Afsar et al. | 712/207 |
| 6,553,501 B1 | 4/2003 | Yokoe | |
| 6,578,107 B1 * | 6/2003 | Anderson et al. | 711/113 |
| 2003/0105847 A1 * | 6/2003 | Jennery et al. | 709/223 |
| 2003/0152005 A1 * | 8/2003 | Miyamoto | 369/53.37 |
| 2003/0163617 A1 * | 8/2003 | Shigenobu | 710/36 |

* cited by examiner

*Primary Examiner* — Tariq Hafiz
*Assistant Examiner* — Dean Phan
(74) *Attorney, Agent, or Firm* — Fellers, Snider, et al.

(57) ABSTRACT

Method and apparatus for servicing commands such as the type issued by a host device to load an operating system from an associated data storage device. A controller is adapted to, upon receipt of a selected command sequence comprising a first command followed by a second command, determine an elapsed time interval between the first and second commands. The controller further uses the elapsed time interval to subsequently service the first and second commands during a subsequent receipt of the selected command sequence. Preferably, a command history table is generated to list the commands in the command sequence and the associated time intervals, and to use the time intervals to predict when the next command will occur. Readback data are pre-fetched to a buffer to expedite servicing of the commands, and the controller selectively enters one or more reduced power modes between successive commands to reduce power consumption levels.

20 Claims, 5 Drawing Sheets

EXPEDITED AND LOW POWER COMMAND SEQUENCE SERVICING

FIELD OF THE INVENTION

The claimed invention relates generally to the field of computer-based systems and more particularly, but not by way of limitation, to an apparatus and method for servicing commands received in a selected command sequence in an expedited, low power manner.

BACKGROUND

Computer-based systems enable a wide variety of data processing tasks to be accomplished in a fast and efficient manner. From hand-held consumer products to geographically distributed wide area networks with multi-device data storage arrays, such systems continue to increasingly pervade all areas of society and commerce.

Software is often provided to direct the operation of such systems. Software (including firmware) can take a number of forms such as application programs, operating systems, interface and controller routines, and maintenance and housekeeping modules.

During system initialization, the software is often initially configured to place the system into an operational ready mode, which can include the loading of an operating system from a peripheral device to a host device. During subsequent operation, each initiated software process, such as a host command request, can result in the operation of a number of other routines to carry out various tasks required to complete the initial process.

As systems continue to be provided with ever increasing levels of hardware and software complexity, there is a continual need for improvements in the manner in which a device services a command sequence, such during the loading of an operating system from a data storage device to a host device.

SUMMARY OF THE INVENTION

Preferred embodiments of the present invention are accordingly directed to an apparatus and method for servicing commands in a selected command sequence.

In accordance with some preferred embodiments, the apparatus generally comprises a controller adapted to, upon receipt of the selected command sequence comprising a first command followed by a second command, determine an elapsed time interval therebetween, and to use the elapsed time interval to subsequently service the first and second commands during a subsequent receipt of the selected command sequence.

The apparatus further preferably comprises an interface circuit adapted to communicate with a host device, wherein the selected command sequence is issued by the host device and received by the interface circuit. The apparatus further preferably comprises a storage medium and the first and second commands comprise data transfer commands to transfer data between the medium and the host device.

Preferably, the selected command sequence comprises commands associated with a loading operation in which operating system software is transferred from the apparatus to the host device.

The controller preferably pre-fetches from the medium to a buffer readback data associated with at least a selected one of the first and second commands to expedite servicing of the commands. The controller further preferably initiates one or more reduced power modes in relation to the magnitude of the elapsed time interval.

In accordance with further preferred embodiments, the method preferably comprises steps of receiving a selected command sequence comprising a first command followed by a second command, determining an elapsed time interval between the first and second commands, and using the elapsed time interval to subsequently service the first and second commands during a subsequent receipt of the selected command sequence.

As before, the selected command sequence preferably comprises commands associated with a loading operation in which operating system software is transferred from a data storage device to a host device.

The using step preferably comprises pre-fetching readback data associated with at least a selected one of the first and second commands prior to receipt of the associated command. The using step also further preferably comprises selectively entering one or more reduced power modes in relation to the elapsed time interval.

The method further preferably comprises generating a command history table which stores the first command, the second command and the elapsed time interval, and using the command history table to predict a future time at which the second command will be received during the subsequent receipt of the selected command sequence.

In this way, the command sequence can be identified and serviced in a reduced amount of time since command requests are anticipated and requested data can be pre-fetched to the buffer for immediate availability. The command-sequence can further be executed with lower power consumption since the device can intelligently enter power saving modes between successive commands.

These and various other features and advantages which characterize the claimed invention will become apparent upon reading the following detailed description and upon reviewing the associated drawings.

DETAILED DESCRIPTION

Figure 1:
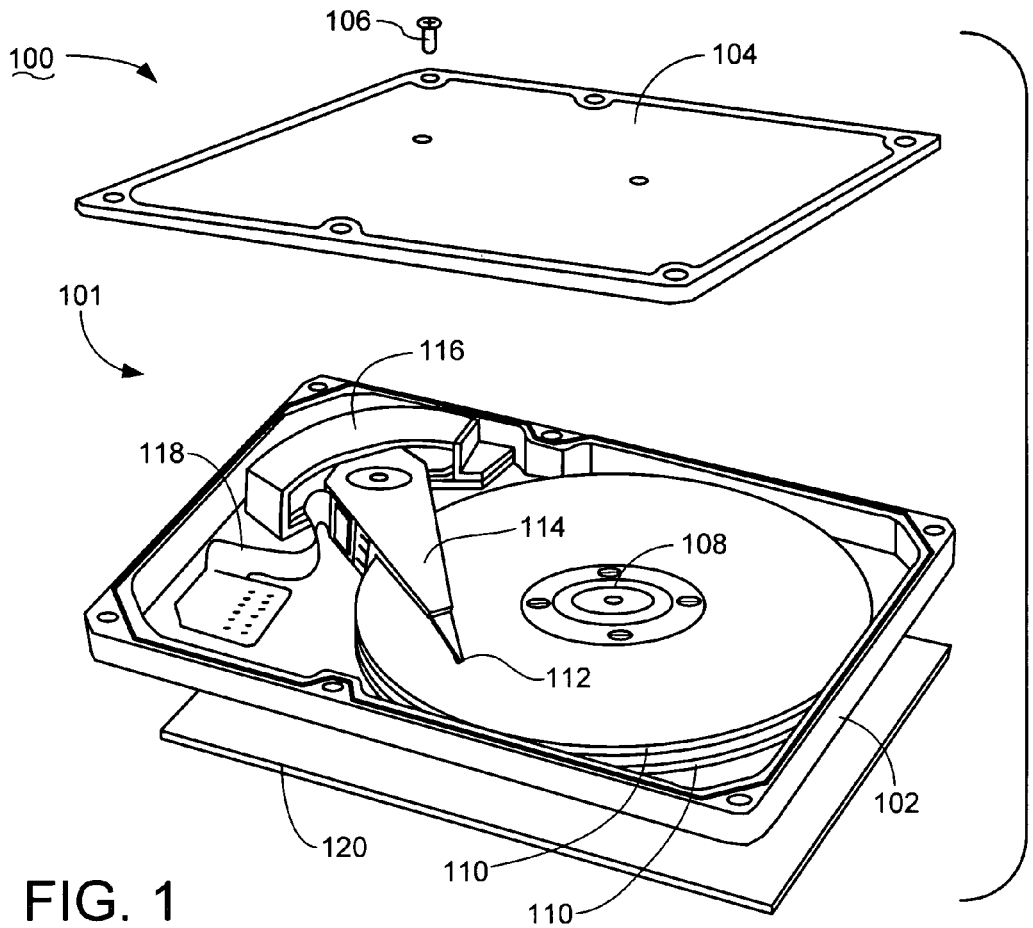
FIG. 1 is an exploded view of a data storage device constructed and operated in accordance with preferred embodiments of the present invention.

To illustrate an exemplary environment in which presently preferred embodiments of the present invention can be advantageously practiced, FIG. 1 shows an exploded view of a data storage device 100. The device 100 is preferably characterized as a small form factor disc drive used to store and retrieve user data in a battery-operated, handheld mobile product such as a notebook computer or a digital camera, but such is not limiting to the scope of the claimed subject matter.

The device 100 includes a rigid, environmentally controlled housing 101 formed from a base deck 102 and a top cover 104 which are mated together using a plurality of fasteners 106. A spindle motor 108 is mounted within the housing 101 to rotate a number of data storage media 110 (in this case, two) at a relatively high speed.

The media 110 are accessed by a corresponding array of data transducing heads 112. The heads 112 are supported by an actuator 114 and moved across the media surfaces by a voice coil motor, VCM 116. A flex circuit assembly 118 facilitates communication between the actuator 114 and control circuitry disposed on a printed circuit board, PCB 120. The PCB 120 is preferably mounted to an exterior surface of the base deck 102.

Figure 2:
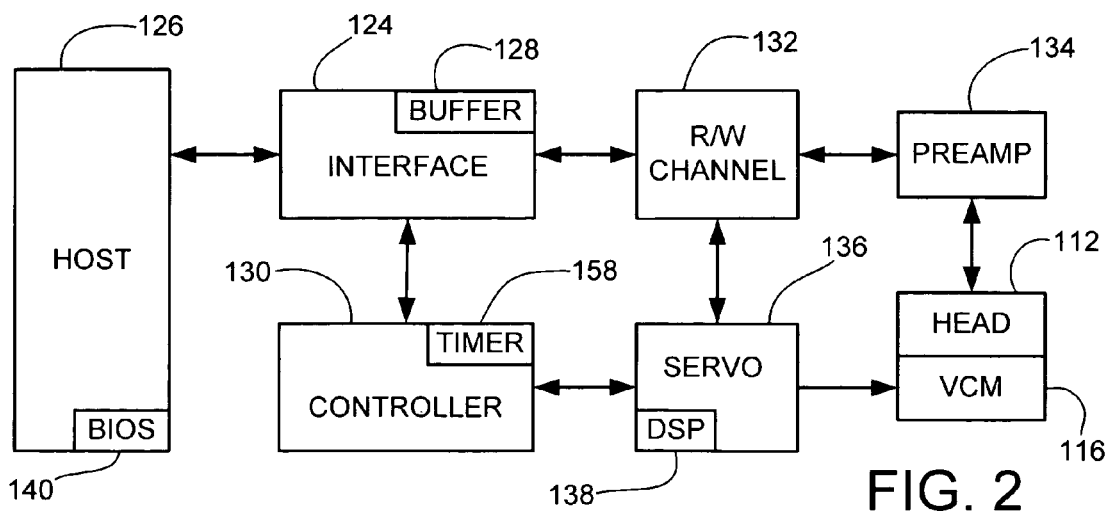
FIG. 2 is a generalized functional block diagram of the device of FIG. 1 in conjunction with a host.

As shown in FIG. 2, the control circuitry includes an interface circuit 124 which communicates with a host device 126 using a suitable interface protocol (fibre channel, SAS, SCSI, etc.). The interface circuit 124 includes a buffer (cache memory) 128 for the temporary storage of data being transferred to or from the media 110. A controller 130 provides top level control for the device 100 and is preferably characterized as a programmable, general purpose processor with suitable programming to direct the operation of the device 100.

A read/write channel 132 encodes data to be written to the media 110 during a write operation and reconstructs transduced readback signals from the media 110 to reconstruct previously stored data during a read operation. A preamplifier/driver circuit (preamp) 134 provides head selection circuitry and conditions signals provided to and received from the heads 112. The preamp 134 is preferably placed in close proximity to the heads 112, such as on the side of the actuator 114 as shown in FIG. 1.

A servo circuit 136 provides closed loop positional control for the heads 112, and preferably includes a digital signal processor (DSP) 138 which operates in accordance with associated programming and in response to control inputs from the top level controller 130.

It is contemplated that the host 126 is characterized as a computer-based system and utilizes a BIOS module 140 (basic input/output system) to control initialization operations, such as power-up or reboot/reset sequences. The BIOS module 140 is preferably provided in non-volatile memory and provides an initial instruction sequence for the host 126.

The BIOS sequence can include a number of steps such as the loading of interrupt handlers and device drivers, the initialization of various registers and power management systems, the initiation of power on self test (POST) routines for various devices attached to the host (including the device 100), the detection of which devices are bootable, and the loading of an operating system (OS) during a boot sequence. As will be recognized, upon successful conclusion of the boot sequence the system will be in an operational ready mode, and will carry out tasks in accordance with the loaded operating system and any applications running thereon.

FIG. 2 provides a generalized time sequence during the host initialization process with respect to the device 100. A first elapsed period of time represented in FIG. 2 at 142 depicts a POST interval, during which the various aforementioned initializations and test routines are carried out. The POST interval 142 is followed by an OS load interval 144 during which components of the host operating system are sequentially requested from the device 100 and loaded into host memory (not shown).

The POST interval 142 can be divided into the following sequential stages: a first non-operating stage (NOPS) 146 prior to the device POST, the device POST 148 (during which the host 126 verifies the device 100 to be operational), and a second NOPS interval 150 after the device POST and prior to the OS load interval 144. For reference, the term "non-operating" is understood to reflect that, generally, no operational requests are being made to the device 100 from the host 126 during these intervals.

The lengths of the respective NOPS intervals 146, 150 will depend on a number of factors such as the speed of the host processor and the number of devices attached to the host 126, and can thus comprise several seconds or more. Similarly, the loading of the OS during the OS load interval 144 generally comprises a sequence of read and write commands during which the device 100 is instructed to seek to various locations on the media 100 and read or write data. The OS load interval 144 can thus also nominally require several seconds to complete, depending on the configuration of the system.

Accordingly, preferred embodiments of the present invention are generally directed to servicing commands received in a selected command sequence to efficiently transfer data between the storage media 110 and the host device 126.

Preferably, the commands relate to the loading of the OS during the interval 144, but such is not necessarily limiting to the claimed invention. Readback data associated with the host commands are preferably pre-fetched to the buffer 128, decreasing the elapsed time required to complete the servicing of the commands. Further, power saving modes are preferably entered as appropriate between selected pairs of the commands to reduce power consumption by the device 100.

Figure 4:
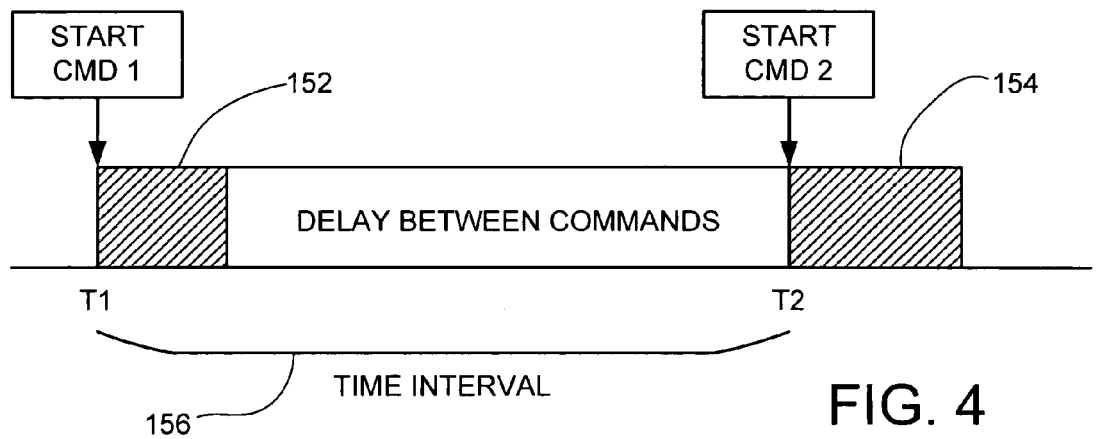
FIG. 4 illustrates a time interval between commands issued by the host.

FIG. 4 illustrates a time line to show sequential receipt of first and second host commands (denoted at 152, 154) during operation of the system of FIG. 2. A time interval 156 is preferably determined as the elapsed time between the start of the first command 152 and the start of the second command 154, and so the time interval 156 preferably includes the execution time associated with execution of the first command 152.

Preferably, during an initial OS load sequence the controller 130 (FIG. 2) utilizes a timer 158 to capture the time intervals between each of a sequence of the host commands. The controller 130 preferably uses these time intervals to generate a command history table (CHT) 160 having a format such as depicted generally in FIG. 5. Each entry in the CHT 160 includes a command field 162 that identifies the host command and one or more logical block address (LBA) range fields 164 that identify the particular LBAs, or sectors, of data associated with the host command (i.e., those sectors to which data are written or from which data are retrieved during the execution of the command).

Each entry in the CHT 160 further preferably includes a sector count field 166 which identifies the number of associated sectors (LBAs), and a time interval (T-INT) field 168 which stores the associated time interval measured between each pair of successive commands (such as the interval 156 in FIG. 4). The particular format and number of entries can be varied as desired, and can include all or a portion of the sequential host commands during a given session.

For purposes of the present discussion it will be contemplated that the CHT 160 is configured to hold a total of 100 entries, so that the CHT 160 reflects the first 100 commands issued by the host 126 during the OS load interval 144. It is further contemplated for the present discussion that these 100 commands do not constitute all of the commands utilized during the OS load interval 144; that is, the total number of commands issued by the host during the OS loading process is greater than 100, so that the CHT 160 is an initial subset of the overall process. However, in other preferred embodiments the CHT 160 can be readily configured to list all of the commands in the OS load process, as desired.

The CHT 160 is preferably stored in non-volatile memory within the device 100, such as in one or more reserved sectors on the media 110 which are accessible by the heads 112, but are not normally utilized to store and retrieve user data.

Figure 3:
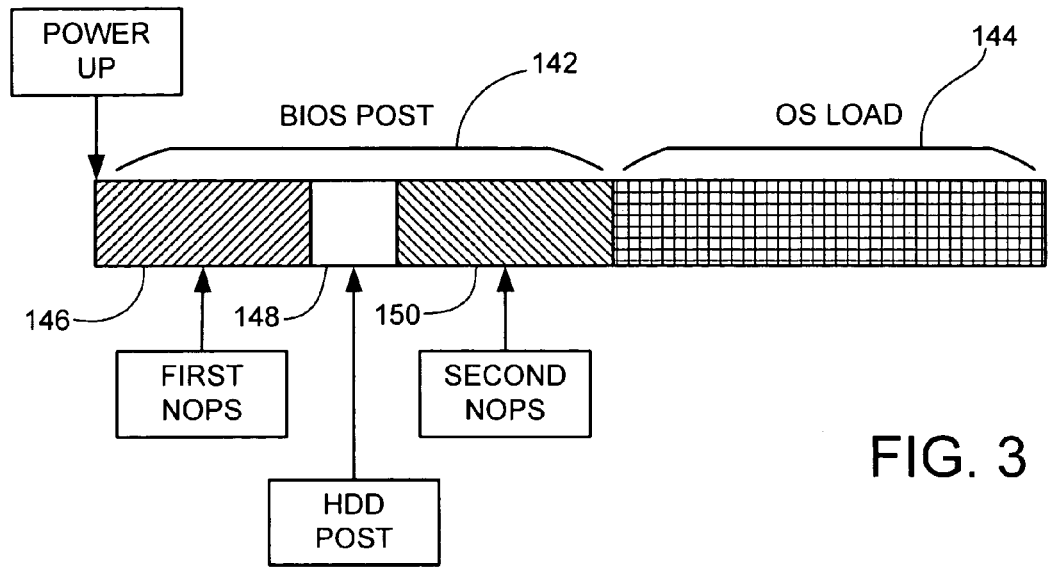
FIG. 3 provides a time sequence associated with an initialization operation for the system of FIG. 2.
Figure 5:
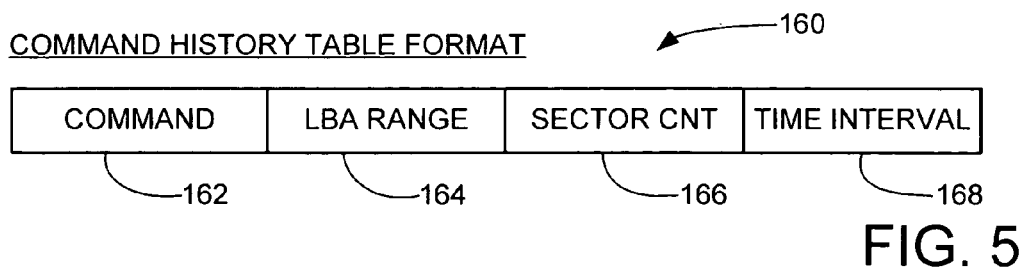
FIG. 5 provides a format for a command history table (CHT) captured by the device for a sequence of commands from the host, such as during the initialization operation of FIG. 3.
Figure 6:
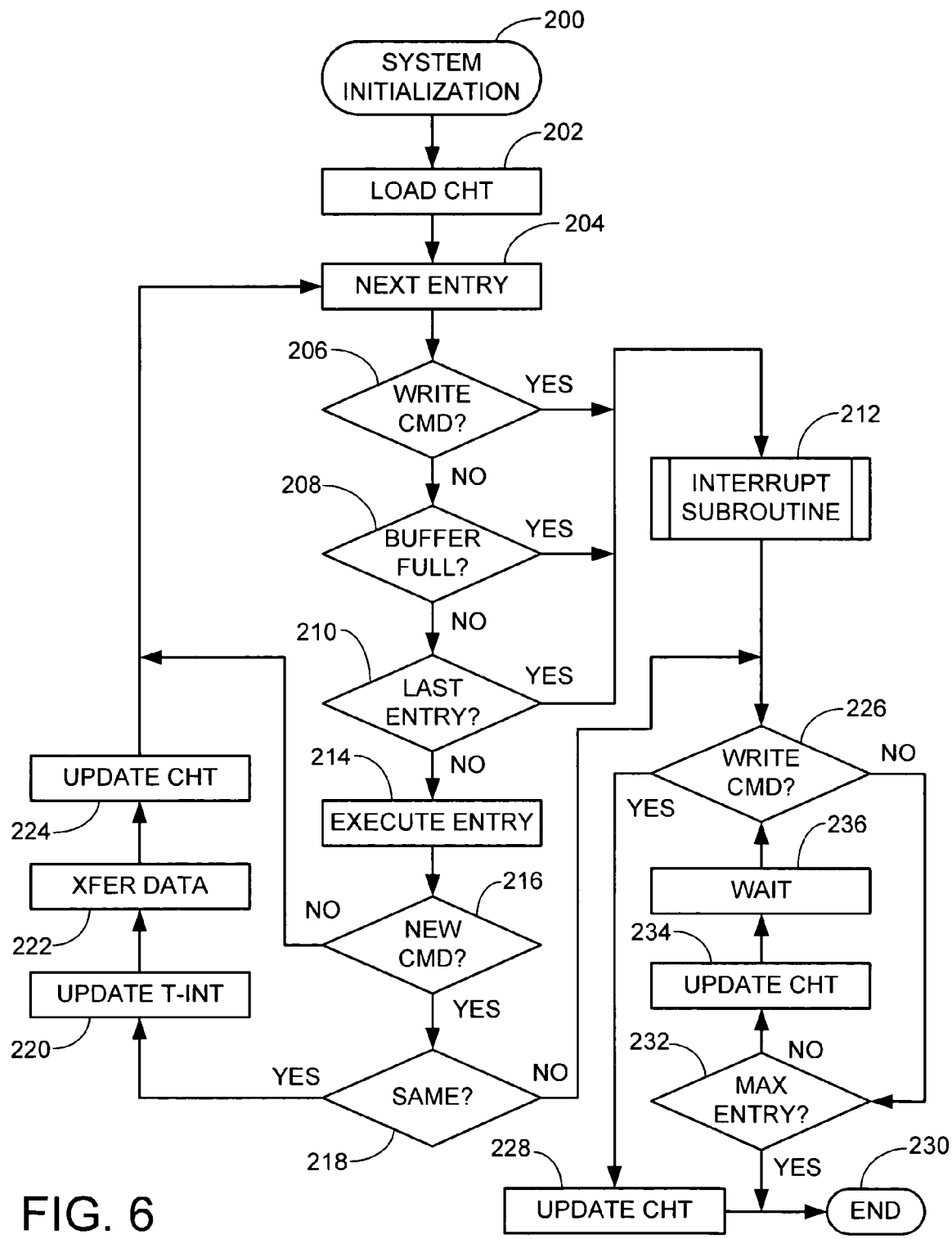
FIG. 6 is a flow chart for a SYSTEM INITIALIZATION routine illustrative of steps carried out in accordance with preferred embodiments of the present invention to use the CHT of FIG. 5 to reduce power consumption and reduce access time during the servicing of the sequence of commands in the CHT of FIG. 5.

FIG. 6 provides a flow chart for a SYSTEM INITIALIZATION routine 200, representative of preferred steps carried out by the device 100 to utilize the CHT 160 of FIG. 5. The device 100 preferably begins the routine 200 prior to the OS load interval 144, such as during the second NOPS interval 150 (see FIG. 3). It is further contemplated that the controller 130 initiates and periodically resets the timer 158 during the course of the routine 200, as will be discussed below.

At step 202, the CHT 160 is first loaded from the reserve sectors into a program area of the buffer 128 or other suitable memory location accessible by the controller 130. At step 204, the next sequential entry in the CHT 160 is evaluated. This will comprise the first entry in the CHT 160 during the first time through the routine 200. Each successive entry will generally be evaluated in turn except as noted below.

As next shown by decision steps 206, 208 and 210, the controller 130 preferably determines whether three conditions apply with regard to the selected entry: (1) whether the command associated with the selected entry is a write command, (2) whether the buffer 128 is full, and (3) whether the selected entry is the last entry in the CHT 160.

As will be recognized, the first condition relates to the nature of the command associated with the selected entry; that is, the command will generally comprise a write command to write data to the media 110, a read command to read data from the media 110, or some sort of status or other type of command not involving data transfer. The second condition relates to whether the buffer 128 is now full of pre-fetched data (which will be unlikely the first time through the routine 200). The third condition relates to whether the selected entry is the last entry in the CHT 160 (again, this will be unlikely the first time through the routine 200).

Whenever any of these three conditions are satisfied, the routine passes to an interrupt subroutine 212 which will be discussed more fully below with respect to FIG. 7. Otherwise, the flow passes to step 214 wherein the device 100 operates to execute the command associated with the selected entry, which can include the retrieval of the associated LBAs from the media 110 and placement of such into the buffer 128 if the selected entry constitutes a read command.

Preferably, at this point the routine 200 returns as shown by decision step 216 and continues to evaluate each entry in the CHT 160 in turn until either an actual command is received from the host 126, or until at least one of the foregoing conditions of steps 206, 208 and 210 is satisfied.

At this point in the discussion it will be contemplated that a new actual command is in fact received from the host 126. Accordingly, the routine passes to decision step 218 where an inquiry is made to determine whether the issued command is the same as at least a selected one of the pre-executed commands from the CHT 160.

If so, the device 100 will preferably update the time interval (T-INT) in the CHT 160 to a value of zero (0) seconds, step 220, and will transfer the associated data from the buffer 128 to the host 126, step 222. The device 100 will also preferably update the latest CHT entry in the reserve sector at step 224 and return to evaluate the next entry in the CHT 160 at step 204.

If the new command received at step 218 is not the same as one of the pre-executed commands from the CHT 160, the flow will continue to decision step 226 where the controller 130 will determine whether the new actual command from the host 126 is a write command. If so, the controller 130 will preferably discard the remaining entries in the CHT 160 and the cached pre-fetched data in the buffer 128, capture the new command sequence from this point forward and provide an updated CHT 160 to the reserved sectors, as represented by step 228. The routine then exits (end step 230). The new, updated CHT 160 will be used during the next pass through the routine 200 (such as during the next system initialization operation).

Returning to step 226, if the new actual command is a read command, then the remaining entries in the CHT 160 and the cached pre-fetched data may not necessarily need to be discarded. This is because an additional read command would not tend to affect the results of other read commands that have already been executed.

Accordingly, in this case the flow passes to step 232 wherein the controller 130 determines whether the selected entry is the last entry in the CHT 160 (in this case, entry no. 100). If so, the routine simply ends at step 230; if not, the CHT 160 is updated to reflect this new actual command from the host 126 at step 234, services this command, and the routine enters a waiting state at step 236 to await the next actual command from the host 126. In this way, the CHT 160 will continue to be updated until filled, after which the routine will end at step 230.

Returning again to the decision steps 206, 208 and 210, it will be recalled that once at least one of these three conditions are met (i.e., the next entry in the CHT 160 is a write command, the buffer 128 is full of pre-fetched read data, or the last entry in the CHT 160 has been reached), the routine passes to the aforementioned interrupt subroutine 212. The subroutine 212 includes a number of interrelated, parallel paths, each of which will be covered in detail in turn.

Figure 7:
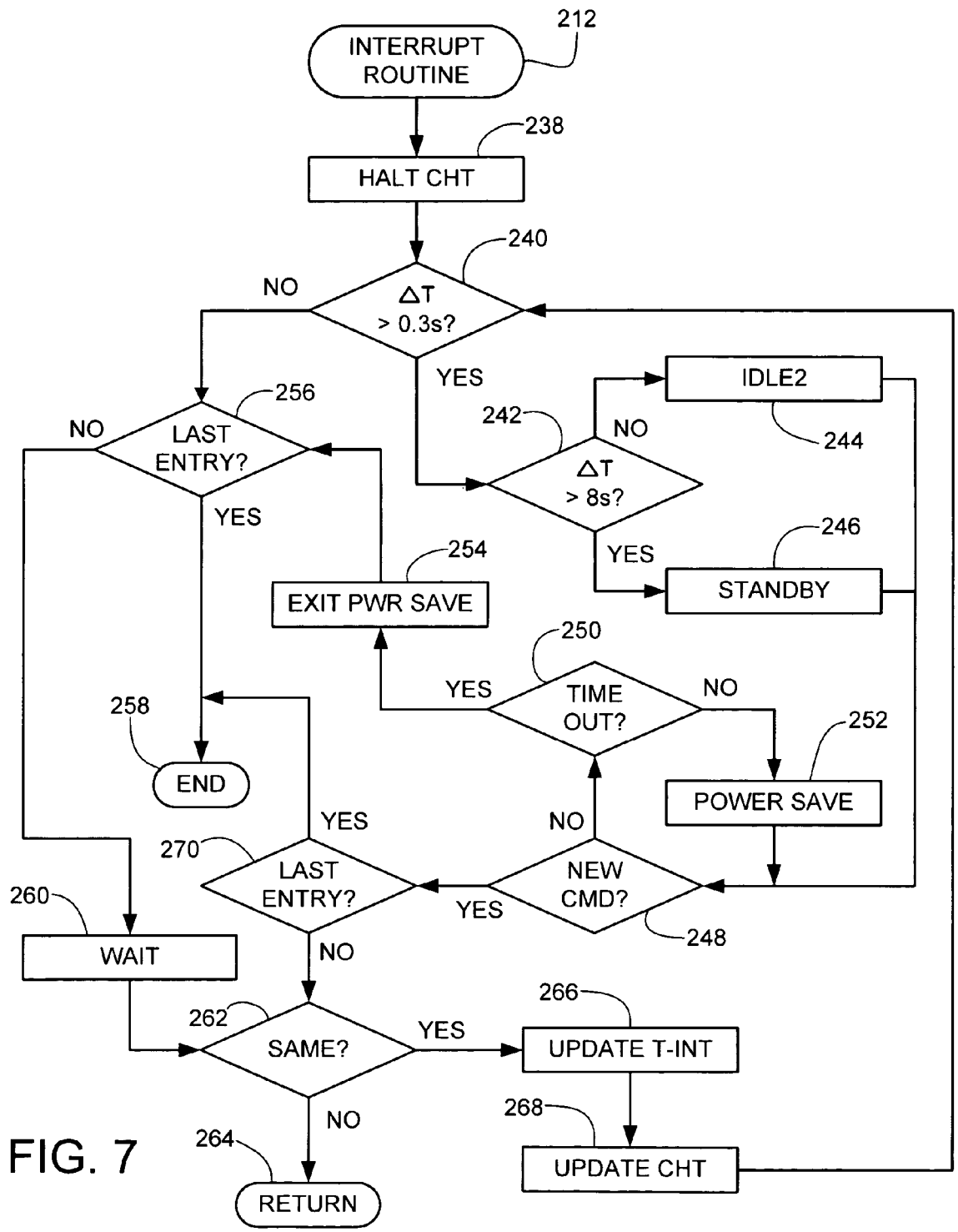
FIG. 7 is a flow chart for an INTERRUPT subroutine which preferably forms a portion of the routine of FIG. 6.

As represented in FIG. 7, a first preferred step carried out by the subroutine 212 is a temporary halting of further CHT pre-execution activities, as depicted by step 238. This allows the controller 130 to determine whether it would be appropriate at this time to temporarily enter a power saving mode during which at least some of the operational components of the device 100 are turned off or placed in a less power consuming mode of operation.

The particular boundary conditions utilized during the subroutine 212 to guide these decisions are preferably empirically derived as discussed below. At this point it will be understood that such empirical analysis has resulted in the determination of the various exemplary set points shown in FIG. 7.

The first set point is represented in decision step 240. During this step, the controller 130 preferably compares the then existing output of the timer 158 to the time interval (T-INT) for the next entry in the CHT 160 to determine a $\Delta T$ value. The $\Delta T$ value generally represents an estimate of the amount of time before receipt of the next host command.

As shown by step 240, if the ΔT value is greater than or equal to a first value (in this case 0.3 seconds), it will be presumed that the next host command will not likely occur for at least 0.3 s and the controller 130 will elect to enter a selected power saving mode in the interim.

The particular mode will further preferably depend upon the actual magnitude of the ΔT value; as shown by decision step 242, if the ΔT value is greater than or equal to a second, larger value (in this case 8 s), then the controller 130 places the device 100 into a greater power saving mode (e.g., STANDBY mode) as shown by step 244. Otherwise, the controller 130 places the device 100 into a lesser power saving mode (e.g., IDLE2 mode), step 246.

The STANDBY and IDLE2 modes are merely illustrative of different hierarchies of power management that can be used as desired. For reference, IDLE2 mode preferably includes the parking of the actuator 114 in a parked position and the deactivating of the VCM 116 and the associated servo circuit 136 (see FIGS. 1 and 2). Because read and write operations are suspended, this mode also allows substantial reductions in power applied to the VCM driver circuitry, servo electronics, preamp 134 and the read/write channel 132. Portions of the interface circuit 124 and certain routines of the controller 130 can also be deactivated as well because the servo and read/write subsystems are not active.

STANDBY mode preferably includes all of the power saving steps of IDLE2, plus an additional reduction in power which is achieved by halting further operation of the spindle motor 108 and associated spindle control and driver circuitry.

Entering a greater power savings mode generally results in greater amounts of power saved, but at a price both in terms of recovery time and recovery power required to restore the device 100 to active mode. While the device 100 remains in one of the power saving modes of steps 244, 246, the controller 130 continues to monitor for receipt of the next actual command from the host 126, as shown by decision step 248.

Preferably, upon entering the associated power saving mode, the controller 130 resets or otherwise keys the timer 158 to begin a time out period for the power saving mode, as depicted by decision step 250. This time out period is associated with the expected time until receipt of the next command. In this way, if an actual command from the host 126 is not received in the interim, the controller 130 will continue to maintain the device in the associated power saving mode until the completion of this time out period, as depicted by the loop formed by steps 248, 250 and 252.

At such time that the time out period ends (without receipt of an intervening actual host command), the flow passes from step 250 to step 254 wherein the controller 130 brings the device 100 out of the power saving mode and back into the operational ready mode. The appropriate time out period is preferably selected to place the device 100 in the operational ready mode just prior to the next expected command; thus, more reinitialization time will generally be required for a greater power saving mode (e.g., STANDBY) as compared to a lesser power saving mode (e.g., IDLE2).

Continuing with a review of FIG. 7, when the device 100 is brought back out of one of the power saving modes of steps 244, 246, or when the initial ΔT value is found to be less than the first value (i.e., ΔT is not equal to or greater than 0.3 s), the routine continues to decision step 256 where the controller 130 checks the CHT 160 for the next entry. If all entries in the CHT 160 have been serviced and thus there are no more commands in the table to be serviced, the subroutine 212 (and hence the routine 200 of FIG. 6) ends at step 258.

On the other hand, if entries remain in the CHT 160, the subroutine waits for the next incoming actual command from the host 126 until such command is received (step 260). At decision step 262, the controller determines whether the actual command from the host 126 is the same as the command associated with the selected entry in the CHT 160; if not, then a discrepancy is noted and the subroutine 212 returns back to the flow of FIG. 6 at step 264 to carry out the aforementioned operations set forth by steps 226 through 236 in FIG. 6.

When the actual command from the host 126 matches the CHT 160, as before the time interval (T-INT) is updated to zero seconds at step 266 and the CHT 160 is updated at step 268. The subroutine then returns to step 240 to once again consider whether it would be appropriate to enter a power saving mode of operation until receipt of the next actual command from the host 126.

It was mentioned previously that at such times that the device 100 enters one of the selected power saving modes, the controller 130 monitors for receipt of an actual command from the host during the associated time out period. It will now be understood that when such occurs, the flow in FIG. 7 passes from decision step 248 to decision step 270 which determines whether the last entry of the CHT 160 has been serviced and further processing takes place accordingly as previously described. Although not shown in FIG. 7, if an actual host command is received during a time out period, it will be understood that the controller 130 will resume normal operation for the device 100, as required.

It is contemplated that the routines of FIGS. 6 and 7 will tend to reduce power consumption and access time required during the servicing of the host commands associated with the CHT sequence. While the actual characteristics of a given device will depend on the construction thereof, FIG. 8 generally illustrates various power requirements found for different modes of operation for a particular type of the device 100. A first bar chart set 300 represents operation of the device 100 during normal, operational ready mode, a second bar chart set 302 represents operation during IDLE2 mode, and a third bar chart set 304 represents operation during STANDBY mode. Each of these respective sets 300, 302 and 304 are shown with respect to a given time interval (T-INT) between receipt of first and second host commands (C1 and C2, respectively).

As shown by set 300, an average steady-state power consumption level of about 1.35 watts was determined for operation of the device 100 in the normal, operational ready mode.

As shown by set 302, placing the device 100 in IDLE2 mode between the commands C1, C2 resulted in a reduction of steady-state power consumption to a lower level of 0.80 watts for most of the time interval T-INT. A recovery period comprising 0.04 seconds during which a peak power level of 2.30 watts was found to be required to bring the device 100 back into the operational ready mode in time to service the C2 command.

Set 304 depicts operation of the device in STANDBY mode between the commands. In this mode, steady state power consumption was significantly reduced to a yet further lower level of 0.26 watts. However, a peak power level of 3.00 watts was required during a recovery period of 1.37 seconds in order to bring the device 100 back into the operational ready mode. As will be recognized, one factor which led to this significantly longer recovery period (and higher power requirement) was the time required to accelerate the spindle motor 108 from rest and back to operational speed.

It follows that the power savings achieved from entering a given power savings mode will be offset by the energy required to bring the device back into the operational ready mode. FIG. 9 provides a generalized graphical representation of various energy consumption curves obtained for the various modes of FIG. 8: curve 310 corresponds to operation of the device 100 in the operational ready mode, curve 312 corresponds to IDLE2 mode and curve 314 corresponds to STANDBY mode.

Figure 8:
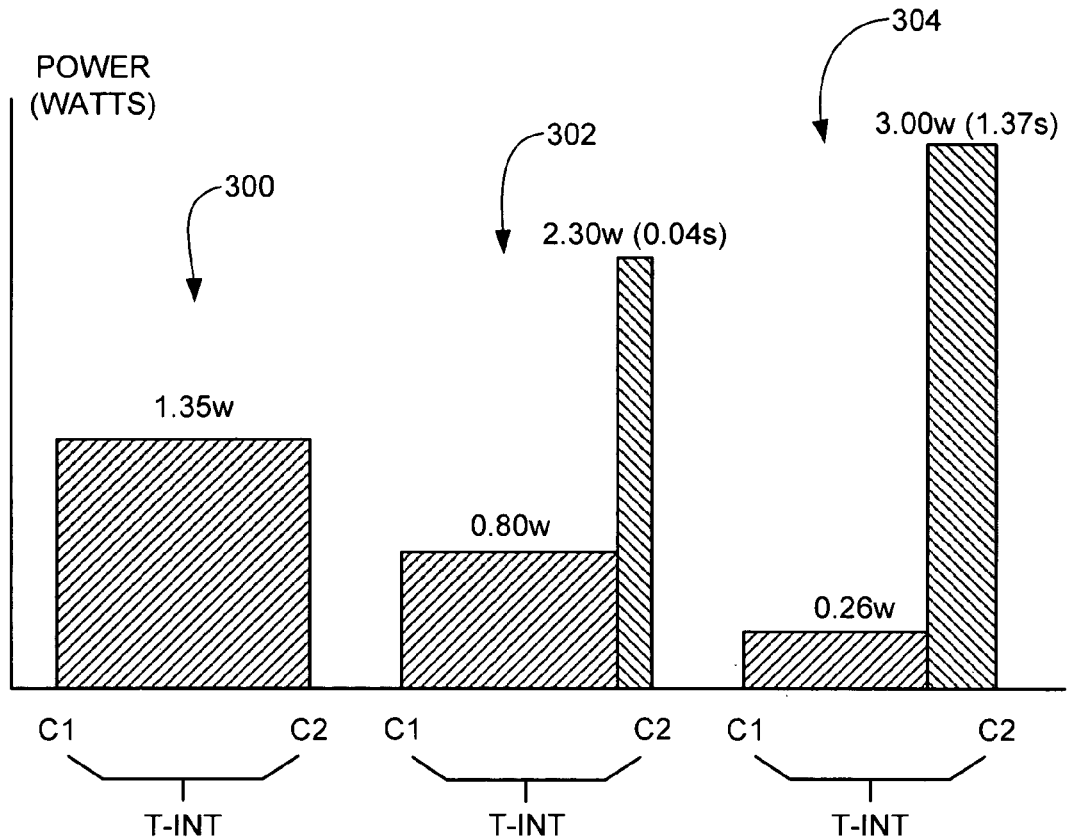
FIG. 8 graphically illustrates respective power requirements for different modes of operation for the device 100.
Figure 9:
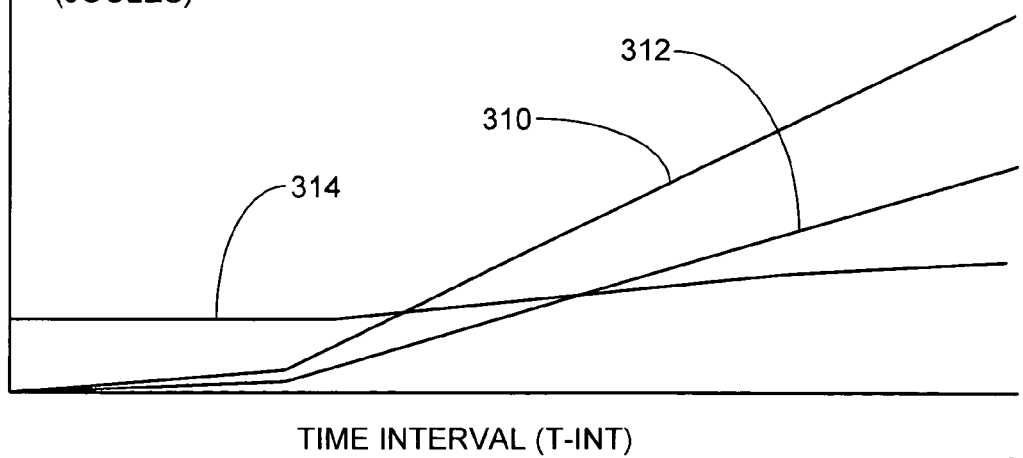
FIG. 9 provides energy consumption curves for each of the different modes of operation of FIG. 8.

From the data of FIGS. 8 and 9, appropriate set points can be selected to determine when the various power saving modes can be efficiently entered to enhance power savings. It has been found that the energy requirements by the device 100 to complete a given sequence can be reduced by about 60% or more using the foregoing approach (i.e., the routines 200, 212 were found to require only 40% as much power as a baseline approach to load the OS to the host 126).

Such power savings can advantageously result in less heat generation and other losses associated with the operation of the device 100. More significantly, such power savings can advantageously operate to extend the operational life of the system when batteries or other limited power sources are employed to provide system power.

Similarly, the routines 200, 212 were also found to provide significant time savings in servicing the host command sequence. Because the routines preferably carry out many of the various data transfer operations prior to receipt of the actual host commands, many of the data request commands can be immediately serviced from the pre-fetched data in the buffer 128, resulting in significant reductions in access time. It has been found that the elapsed time required to complete the given sequence can be reduced by about 95% or more (i.e., the routines 200, 212 required only 5% of the time as compared to the baseline approach to load the OS during the interval 144).

Such time savings can advantageously reduce the time required to place the system in an operational ready mode, increasing the availability of the system to the user. Moreover, the time savings can promote further power savings at the system level; that is, the system itself can be placed into a low power mode more often on the basis that, when the system is again needed, the recovery time required to reinitialize the system is significantly reduced.

Although preferred embodiments presented herein have been generally directed to servicing the host command sequence associated with the OS load interval 144, it is clear that such merely constitutes a preferred application and is not limiting; rather, any number of different command sequences, including sequences issued during operational ready mode, can be captured and thereafter more effectively executed utilizing the various preferred embodiments presented herein.

It will now be appreciated that preferred embodiments of the present invention are generally directed to an apparatus and method for servicing commands such as the type issued by a host device (such as 126) to load an operating system from an associated data storage device (such as 100).

In accordance with some preferred embodiments, the apparatus comprises a controller (such as 130) adapted to, upon receipt of a selected command sequence comprising a first command (such as 152) followed by a second command (such as 154), determine an elapsed time interval (such as 156) between said first and second commands and to use the elapsed time interval to subsequently service said first and second commands during a subsequent receipt of the selected command sequence (such as by 200).

The apparatus further preferably comprises an interface circuit (such as 124) adapted to communicate with a host device (such as 126), wherein the selected command sequence is issued by the host device and received by the interface circuit. The apparatus further preferably comprises a storage medium (such as 110) wherein the first and second commands comprise data transfer commands to transfer data between the medium and the host device.

Preferably, the selected command sequence comprises commands associated with a loading operation in which operating system software is transferred from the apparatus to the host device.

The controller preferably pre-fetches from the medium to a buffer (such as 128) readback data associated with at least a selected one of the first and second commands to expedite servicing of the commands (such as by step 214). The controller further preferably initiates a reduced power mode (such as by steps 244, 246) in relation to the elapsed time interval.

In accordance with further preferred embodiments, the method preferably comprises steps of receiving a selected command sequence comprising a first command (such as 152) followed by a second command (such as 154), determining an elapsed time interval (such as 156) between said first and second commands, and using the elapsed time interval to subsequently service said first and second commands during a subsequent receipt of the selected command sequence (such as by 200).

As before, the selected command sequence preferably comprises commands associated with a loading operation in which operating system software is transferred from a data storage device (such as 100) to a host device (such as 126).

The using step preferably comprises pre-fetching readback data associated with at least a selected one of the first and second commands prior to receipt of the said at least a selected one of the first and second commands, and further preferably comprises selectively entering a reduced power mode in relation to the elapsed time interval (such as by steps 244, 246).

The method further preferably comprises generating a command history table which stores the first command, the second command and the elapsed time interval, and using the command history table to predict a future time at which the second command will be received during the subsequent receipt of the selected command sequence (such as by step 240).

For purposes of the appended claims, the recited first means will be understood to correspond to the disclosed controller 130 of FIG. 2 programmed to carry out the routines of FIGS. 6 and 7.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage device used to load an operating system to a host device, it will be appreciated by those skilled in the art that the claimed subject matter is not so limited and various other processing systems can be utilized without departing from the spirit and scope of the claimed invention.

What is claimed is:

1. An apparatus comprising a controller adapted to use a command history table which stores an elapsed time interval between commands in a transmitted command sequence to pre-fetch data requested by a selected command in the command history table during a subsequent transmission of the command sequence and prior to receipt of the selected command during said subsequent transmission.

2. The apparatus of claim 1, further comprising an interface circuit adapted to communicate with a host device, wherein the commands in said command sequence are issued by the host device and received by the interface circuit.

3. The apparatus of claim 1, wherein the controller generates the command history table responsive to commands issued during a first implementation of a system initialization process, and wherein the controller subsequently uses the generated command history table to pre-fetch said data during a subsequent implementation of the system initialization process.

4. The apparatus of claim 1, wherein the selected command comprises a read command associated with a loading operation in which operating system software is transferred from the apparatus to a host device.

5. The apparatus of claim 1, further comprising a storage medium and a buffer, and wherein the controller pre-fetches the data from the medium to the buffer prior to receipt of the selected command during said subsequent transmission of the command sequence.

6. The apparatus of claim 1, wherein the controller is further adapted to generate the command history table which stores a first command, a second command and the elapsed time interval between reception of the first command and reception of the second command.

7. The apparatus of claim 6, wherein the controller further employs the command history table to predict a future time at which a selected command will be received during the subsequent transmission of the command sequence.

8. The apparatus of claim 6, wherein the controller further adaptively modifies the command history table when a new command is received that was not previously provided during the transmitted command sequence.

9. The apparatus of claim 1, wherein the controller is further adapted to transition from an initial power mode to a reduced power mode and from the reduced power mode back to the initial power mode between servicing of immediately successive commands of the subsequently transferred command sequence in relation to the elapsed time interval.

10. A method comprising steps of servicing commands in a transmitted command sequence, generating a command history table which identifies an elapsed time interval between said commands, and using the command history table to pre-execute selected commands in the command sequence prior to receipt of the selected commands during a subsequent transmission of the command sequence.

11. The method of claim 10, wherein the selected commands comprise read commands associated with a loading operation in which operating system software is transferred from a data storage device to a host device.

12. The method of claim 10, wherein the servicing step is performed during a first initialization of a system, and wherein the using step is performed during a subsequent initialization of the system.

13. The method of claim 10, wherein the command history table stores a first command, a second command and the elapsed time interval therebetween.

14. The method of claim 10, further comprising transitioning from an initial power mode to a reduced power mode and from the reduced power mode back to the initial power mode between servicing of immediately successive commands of the subsequently transferred command sequence in relation to the elapsed time interval.

15. The method of claim 10, wherein the pre-execution of said selected commands during the using step comprises pre-fetching to a cache memory requested data identified by the selected commands in the command history table.

16. The method of claim 15, wherein the using step further comprises transitioning from a first power mode to a reduced power mode when an amount of said pre-fetched requested data in the cache memory reaches a predetermined level.

17. The method of claim 10, wherein the using step further comprises transitioning from a first power mode to a reduced power mode and maintaining said reduced power mode for a duration of time selected in relation to the elapsed time interval of the command history table.

18. A method comprising executing commands received by a device during a first initialization of a system, generating a command history table which lists the executed commands, and executing the listed executed commands in the command history table prior to receipt of the commands by the device during a second initialization of the system.

19. The method of claim 18, wherein the listed executed commands comprise read commands, and wherein executing the listed executed commands comprises pre-fetching data requested by the listed executed commands to a cache memory.

20. The method of claim 19, further comprising transitioning from an initial power mode to a reduced power mode when a total amount of said pre-fetched data in the cache memory reaches a selected threshold.

* * * * *